United States Patent
Cox et al.

(10) Patent No.: US 12,149,026 B2
(45) Date of Patent: Nov. 19, 2024

(54) SUBSEA CONNECTOR HANDLE

(71) Applicant: Siemens Energy Global GmbH & Co. KG, Bayern (DE)

(72) Inventors: Thomas Cox, Ulverston (GB); James Pridmore, Ulverston (GB); Jean-Pierre Smith, Ulverston (GB)

(73) Assignee: Siemens Energy Global GmbH & Co. KG, Munich (DE)

( * ) Notice: Subject to any disclaimer, the term of this patent is extended or adjusted under 35 U.S.C. 154(b) by 422 days.

(21) Appl. No.: 17/640,667

(22) PCT Filed: Sep. 14, 2020

(86) PCT No.: PCT/EP2020/075634
§ 371 (c)(1),
(2) Date: Mar. 4, 2022

(87) PCT Pub. No.: WO2021/052905
PCT Pub. Date: Mar. 25, 2021

(65) Prior Publication Data
US 2022/0325592 A1    Oct. 13, 2022

(30) Foreign Application Priority Data

Sep. 20, 2019 (GB) ..................... 1913607

(51) Int. Cl.
*H01R 13/633*  (2006.01)
*B21D 22/00*  (2006.01)
(Continued)

(52) U.S. Cl.
CPC ......... *H01R 13/6335* (2013.01); *B21D 22/00* (2013.01); *B23K 7/00* (2013.01);
(Continued)

(58) Field of Classification Search
CPC .............. H01R 13/6335; H01R 13/633; H01R 13/523; H01R 13/516; H01R 43/00;
(Continued)

(56) References Cited

U.S. PATENT DOCUMENTS 4,717,351 A * 1/1988 McCormick ......... H01R 13/635
                                                                  439/153
6,554,636 B2 * 4/2003 Walker ............... H01R 13/6335
                                                                  403/33

(Continued)

FOREIGN PATENT DOCUMENTS

GB        2361363 A    10/2001

OTHER PUBLICATIONS

1 International search report and written opinion dated Dec. 11, 2020, for corresponding PCT/EP2020/075634.

*Primary Examiner* — Harshad C Patel
(74) *Attorney, Agent, or Firm* — Wolter Van Dyke Davis, PLLC

(57) ABSTRACT

A subsea wet-mateable connector handle has a handle part, a bushing support ring, a resilient bushing, a connector mount and a securing pin. A method of manufacturing a subsea wet-mateable connector handle includes cutting a handle part from a sheet of inherently corrosion resistant metal plate by a two-dimensional cutting process. A bushing support ring and a bushing are assembled onto a limb extending from the handle part. A connector mount is mounted to the bushing and the connector mount and bushing are fixed to the handle part with the securing pin.

13 Claims, 4 Drawing Sheets

(51) Int. Cl.
  *B23K 7/00*    (2006.01)
  *B23K 10/00*   (2006.01)
  *B23K 15/00*   (2006.01)
  *B23P 15/00*   (2006.01)
  *B24C 5/02*    (2006.01)
  *H01R 13/523*  (2006.01)
  *H01R 43/00*   (2006.01)

(52) U.S. Cl.
  CPC ............... *B23K 10/00* (2013.01); *B23K 15/00* (2013.01); *B23P 15/00* (2013.01); *B24C 5/02* (2013.01); *H01R 13/523* (2013.01); *H01R 43/00* (2013.01)

(58) Field of Classification Search
  CPC .......... B21D 22/00; B23K 7/00; B23K 10/00; B23P 15/00; B24C 5/02
  USPC ....................................... 439/76.1
  See application file for complete search history.

(56) References Cited

U.S. PATENT DOCUMENTS

| | | | |
|---|---|---|---|
| 8,459,155 B2 * | 6/2013 | Canizares, Jr. | F16B 23/0007 411/407 |
| 10,921,531 B2 * | 2/2021 | Wong | G02B 6/3897 |
| 2013/0025419 A1 * | 1/2013 | Opstad | H01R 13/443 81/487 |

* cited by examiner

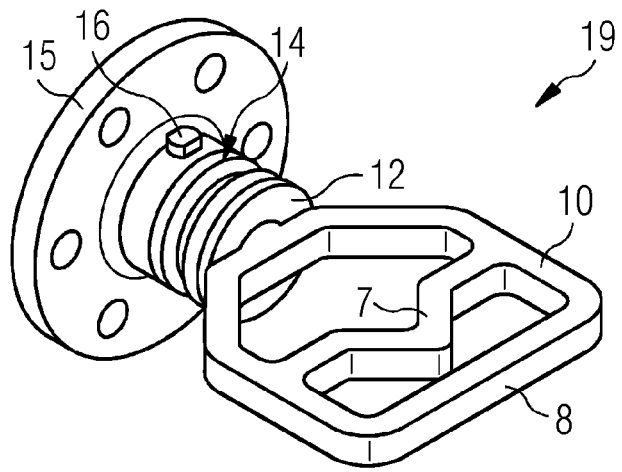
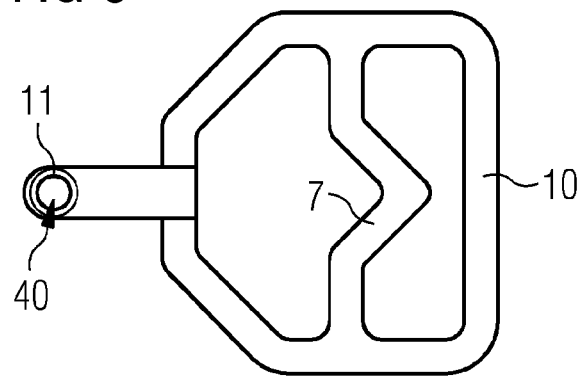
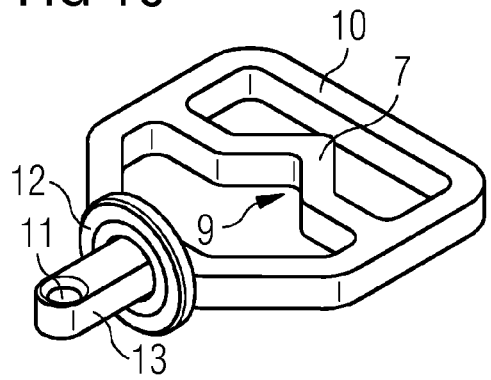

US 12,149,026 B2

SUBSEA CONNECTOR HANDLE

CROSS REFERENCE TO RELATED APPLICATIONS

This application is the US National Stage of International Application No. PCT/EP2020/075634 filed 14 Sep. 2020, and claims the benefit thereof. The International Application claims the benefit of United Kingdom Application No. GB 1913607.6 filed 20 Sep. 2019. All of the applications are incorporated by reference herein in their entirety.

FIELD OF INVENTION

This invention relates to a subsea, or underwater, connector and a method of operating the connector.

BACKGROUND OF INVENTION

Subsea, or underwater, connectors are designed to operate beneath the surface of the water. Typically, a subsea connector comprises two parts, generally known as plug and receptacle. The receptacle may include one or more conductor pins and the plug may include corresponding plug sockets for the receptacle conductor pins. The connection may be made topside (dry-mate), or subsea (wet-mate) and the specific design is adapted according to whether the connector is a wet-mate or dry-mate connector. For wet-mate connectors, the part which is removed and replaced is typically provided with a specialised handle to enable an ROV, or diver, to hold and manipulate the connector part. Skilled operatives are required to manufacture these handles, each of which must be individually tested and verified, adding costs. An improved subsea wet mate connector handle is desired.

SUMMARY OF INVENTION

In accordance with a first aspect of the present invention, a method of manufacturing a subsea wet-mateable connector handle, the handle comprising a handle part, a bushing support ring, a resilient bushing, a connector mount and a securing pin, comprises cutting a handle part from a sheet of inherently corrosion resistant metal plate by means of a two dimensional cutting process; assembling a bushing support ring and a bushing onto a limb extending from the handle part; mounting a connector mount to the bushing; and fixing the connector mount and bushing to the handle part with the securing pin.

The method may further comprise forming a hole and/or chamfer in an end of the limb remote from the handle part, to receive an end of the securing pin.

The two-dimensional cutting process may comprise water jet cutting.

This has the benefit of avoiding heat related modification of the strength or corrosion resistance properties of the sheet metal, so no post processing certification is required.

Alternatively, the two-dimensional cutting process may comprise one of laser cutting, plasma cutting, flame cutting, machining, or stamping.

The method may further comprise a post heat based cutting step of heat treatment to remove stresses such as annealing and/or treatment to rectify stress induced bending.

In accordance with a second aspect of the present invention, a subsea wet-mateable connector handle comprising a handle part, formed by cutting a predetermined shape in a sheet of inherently corrosion resistant metal plate; a bushing support ring, formed by turning a metal disc on a lathe; a resilient bushing; a connector mount; and a securing pin, to secure the connector mount and bushing in place.

The metal may comprise super duplex stainless steel, titanium, or Inconel.

The resilient bushing may comprise rubber or other elastomers.

The bushing support ring may comprise a surface for the bushing to react against, an annular groove to retain and centralise the bushing and a surface for the handle to react against.

The securing pin may comprise one of a two piece threaded pin, a press fit single pin, or a spring pin.

BRIEF DESCRIPTION OF THE DRAWINGS

An example of a subsea connector handle and method of manufacture in accordance with the present invention will now be described with reference to the accompanying drawings in which:

FIG. 8 is a perspective view of an example of a subsea wet mate handle manufactured according to the method of the present invention;

FIG. 9 illustrates more detail of the subsea wet mate handle of FIG. 8, manufactured according to the invention; and, FIG. 10 illustrates more detail of the subsea wet mate handle of FIG. 8, manufactured according to the invention.

DETAILED DESCRIPTION OF INVENTION

The drive to reduce overall lifecycle costs, both capital expenditure (CAPEX) and operational expenditure (OPEX), associated with new deep-water oil and gas developments means that improvements to existing designs, manufacturing processes and operation are desirable. Subsea connector systems are desired that have a lower cost, can be relatively quickly and easily installed and that have reduced maintenance requirements, or need for intervention which affects the systems to which they are connected throughout their working life.

A typical subsea connector comprises a first connector part having a plug and a second connector part having a receptacle. The plug part is brought into contact with the receptacle part to establish a connection. A handle is secured to the rear of the one of the connector parts to enable an ROV, or diver, below the surface of the water to mate or demate the connector parts. Part of the cost of subsea wet mate connectors lies in the cost of manufacturing the handles to allow mating and demating. Typical handle design is described, for example, in GB2361363.

Figure 1:
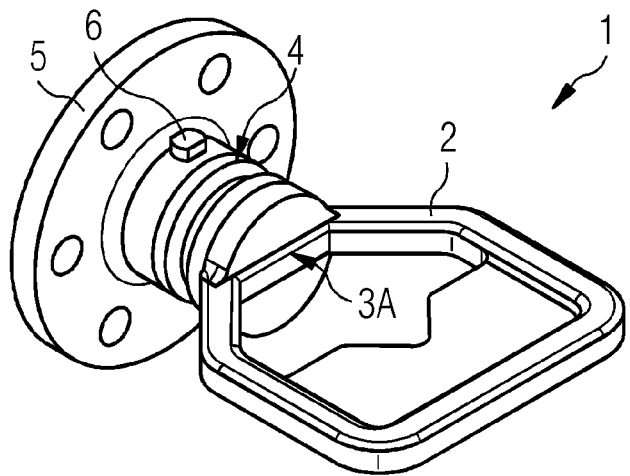
FIG. 1 is a perspective view of an example of a conventional subsea wet mate handle.
Figure 2:
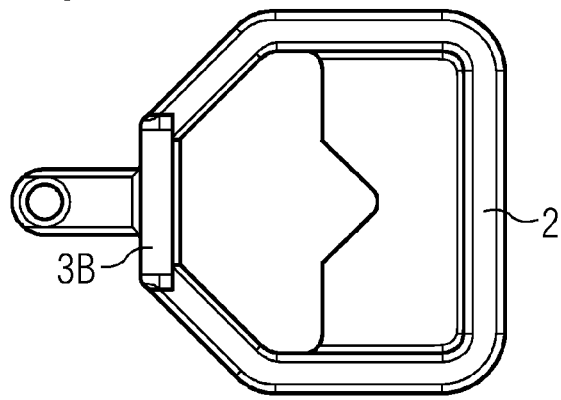
FIG. 2 shows more detail of part of the handle of FIG. 1.
Figure 3:
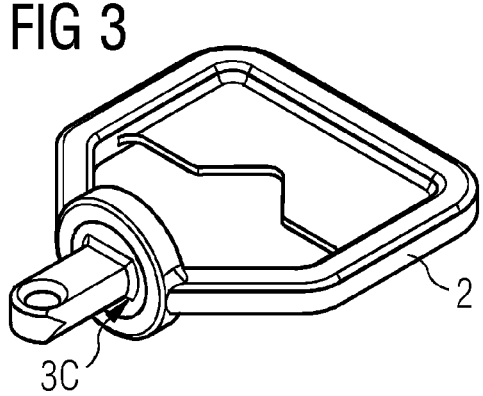
FIG. 3 shows more detail of part of the handle of FIG. 1.

Currently, connector handles may be made from cast metal, or welded metal. An example of a cast handle is shown in FIGS. 1 to 3. A handle 1 comprises a cast handle part 2, with built in bushing support 3a, 3b, 3c. The bushing support comprises a flat part 3a, a curved abutment part 3b, with an annular groove used to retain the bushing in a radial direction and a protruding beam 3c used to centralise the bushing and connect the handle to a connector interface. The casting process is a technique that is typically carried out by specialist operators and the cast components are then supplied to the assembly line. The shape of the cast component means that relatively large amounts of space are required for each part when being transported or stored during the manufacturing process. Before assembly, each casting must be corrosion tested to verify the material condition. After corrosion testing, a compliant rubber bushing 4 is fitted to the bushing support 3a, 3b, 3c. A mount 5, or connector interface plate, is assembled onto the handle part 2 and bushing 4 and secured with a transverse securing pin 6.

An alternative would be to weld the handle, rather than casting. Straight or bent bars may be welded to straight or bent plates to obtain the desired shape, or the protruding bar and support plate may be machined in a lathe, then a flat plate or bar handle welded to the back. However, welding needs to be carried out by highly qualified workers, or expensive welding machines and the quality of the welds must then be verified using CT scanning or dye penetration. Thus, this alternative method of making handles is also expensive and requires significant skill to perform. Following fabrication, there are expensive testing requirements for each batch to verify the performance and this also adds time to the production process.

Figure 4:
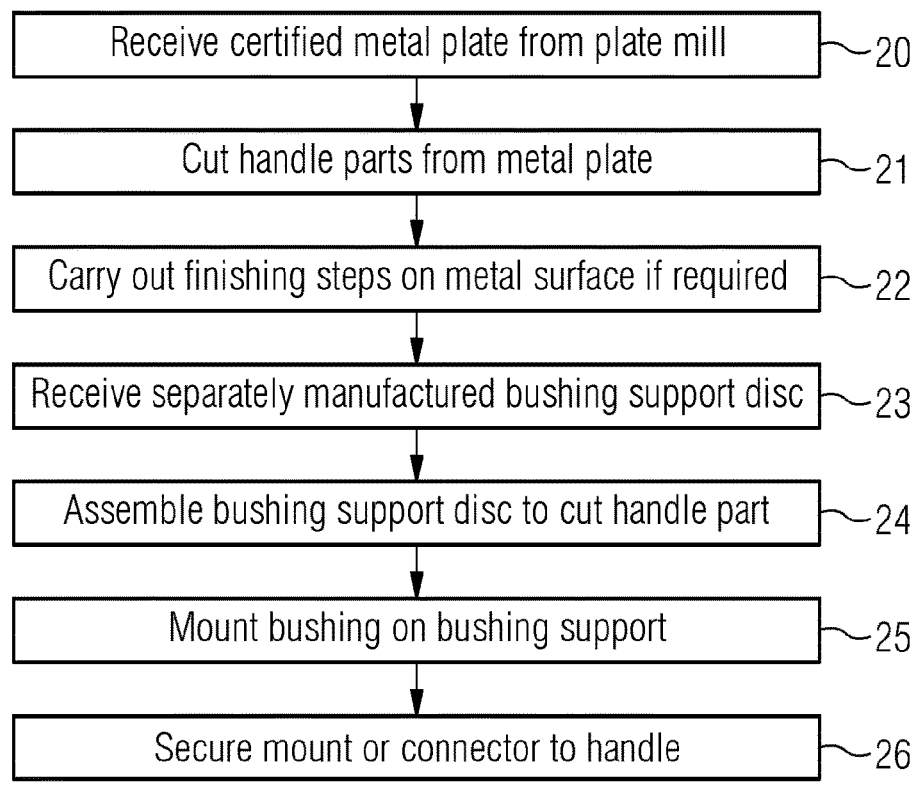
FIG. 4 is a flow diagram of a method of manufacturing a subsea wet mate connector handle according to the invention.
Figure 5:
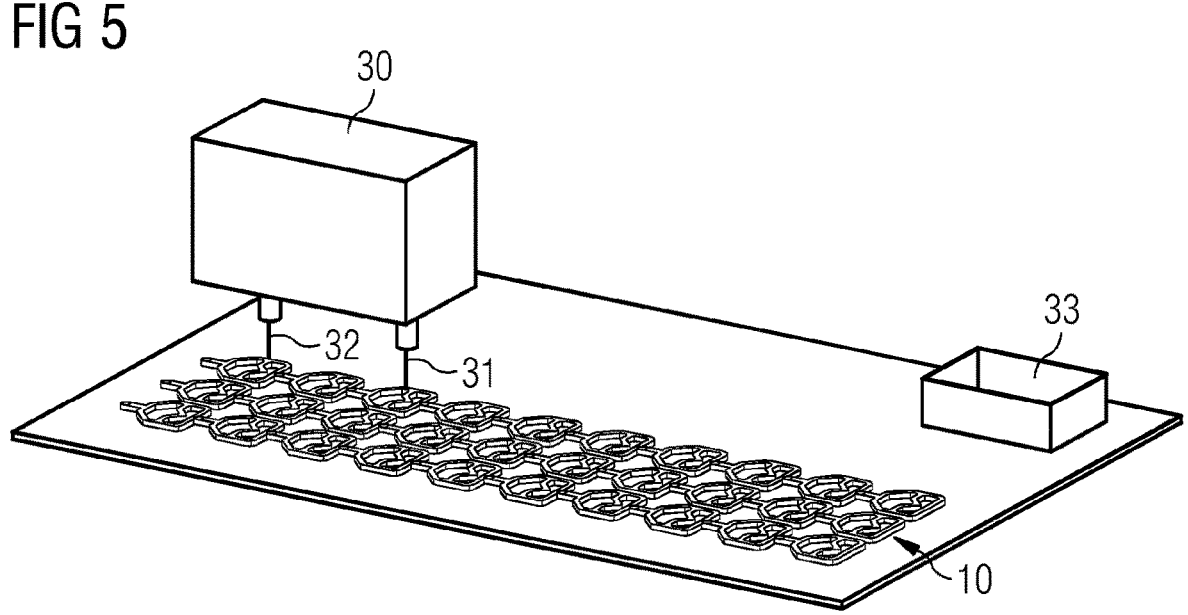
FIG. 5 illustrates the cutting step of the method of FIG. 4.

Further details of the present invention can be understood from the description which follows and the accompanying drawings, in particular, FIGS. 4 to 10. The present invention provides a method of manufacturing a subsea wet-mate connector handle using simpler techniques to reduce cost and avoid delays, for example, caused by multiple certification steps in the fabrication process. In the method of the present invention, as shown in FIG. 4, metal plate which has material certification from the plate mill where it was manufactured is used. As the plate has material certification from the mill, it removes the requirement to perform corrosion testing to verify the exact material properties. The metal is chosen to be one which is inherently corrosion resistant, such as super-duplex stainless steel. Other suitable metals may include Titanium, Inconel or other mechanically strong corrosion resistant metal. The metal plate is received 20 at the fabrication site and handle parts 10 are manufactured from the plate by using a cutting process 21, in particular a water jet cutting process, such as two dimensional (2D) cutting with a water jet cutter 30, as illustrated in FIG. 5. The cutters 31, 32 cut an outline in the plate and the cut-out pieces 10 may be collected in a bin 33 for transport to the next assembly stage illustrated in FIG. 6. By 2D cutting is meant that the cutter moves in one dimension to define a line that is cut, but that line is cut in a straight line from the upper edge of the plate to the lower edge of the plate. There are no bulges, or shaping, as is possible with a casting. Other types of cutting may be used, as described hereinafter, although they do not have all of the advantages of water jet cutting.

The cutting process is typically computer controlled, with the specific design of handle part shape 10 required having been programmed into the system. This gives rise to another advantage compared with casting, which is that the design can be easily changed, simply by altering the instructions programmed into the system. With casting, moulds are required, which are expensive to make, so there are few opportunities for customisation. FIGS. 8 to 10 illustrate an example of a handle 19 according to the invention. The handle design includes a middle bar 7 to give the ROV hand something to grip. Contact at the edge bar 8 and middle bar 7 makes the contact longer overall and thus it is easier for the ROV hand to control the angle of the handle. A handle with a single rear bar, although possible, would be harder to control. The notch 9 in the middle bar allows the third finger of the ROV hand, which typically comprises two fingers on one side and a third finger on the other side, to slip into the notch, which further aids control of the handle orientation. The notch allows the ROV finger to fit and control the angular movement. The overall size of the handle is designed allow retrofitting, as it avoids changes to the space envelope of pre-qualified connectors. The shape fits in with the size of the connectors it has to fit to and the ROV hands that manipulate them.

The handle part 10 design is chosen to be a substantially two dimensional cut out, to which other parts may be assembled subsequently. Multiple handle parts 10 may be cut 21 from one plate in succession, or in parallel, according to the number of water jet cutter jets 31, 32 that operate at one time. A water jet cutting process is substantially cheaper to operate and does not require highly skilled or qualified operators, as was the case with welding or casting processes. Subsequent finishing steps 22 may also be carried out on the cut metal surface. After water jet cutting, the handles may be treated to remove sharps edges, for example by tumbling in a vibrator with abrasive stones. This also creates an abraded surface that is well keyed for a powder coating to be applied and removes any mill scale etc that remains on the plate surfaces. A hole 40 may be drilled in the protruding limb 13 and a chamfer cutting step carried out to apply a chamfer 11 to the hole 40 in the protruding part 13 of the handle 10. These steps may be performed in the same operation. The chamfered hole 40 is designed to receive an end of a transverse securing pin 15, which is used to hold the mount or connector 16 in place. The securing pin provides a method of retention in the connector, which may take one of many different forms, for example, a two-piece threaded pin, a press fit single pin, or some form of spring pin. The pin 15 may be cylindrical to fit through the chamfered hole 11 in the handle 10 and allow the handle to move on the pin providing compliance. Alternatively, the pin may be double tapered to fit through a plain hole, without a chamfer, where the tapers on the pin allow the compliant movement.

The water jet cutting machine 30 may be set up to drill and chamfer the holes before the handles are cut from the sheet, or this step may be carried out later, after the handles have been cut. The remaining metal plate is removed and recycled after the cutting has been completed. The use of a water jet does not create a heat affected zone and thus does not change the mechanical properties of the base material, meaning that no post processing certification of the material strength is required. Another advantage is that the waterjet process applies very little load to the plate, so components generally have not moved after machining is carried out. By contrast cutting with a CNC mill requires components to be rigidly fixed in place to prevent movement.

Figure 6:
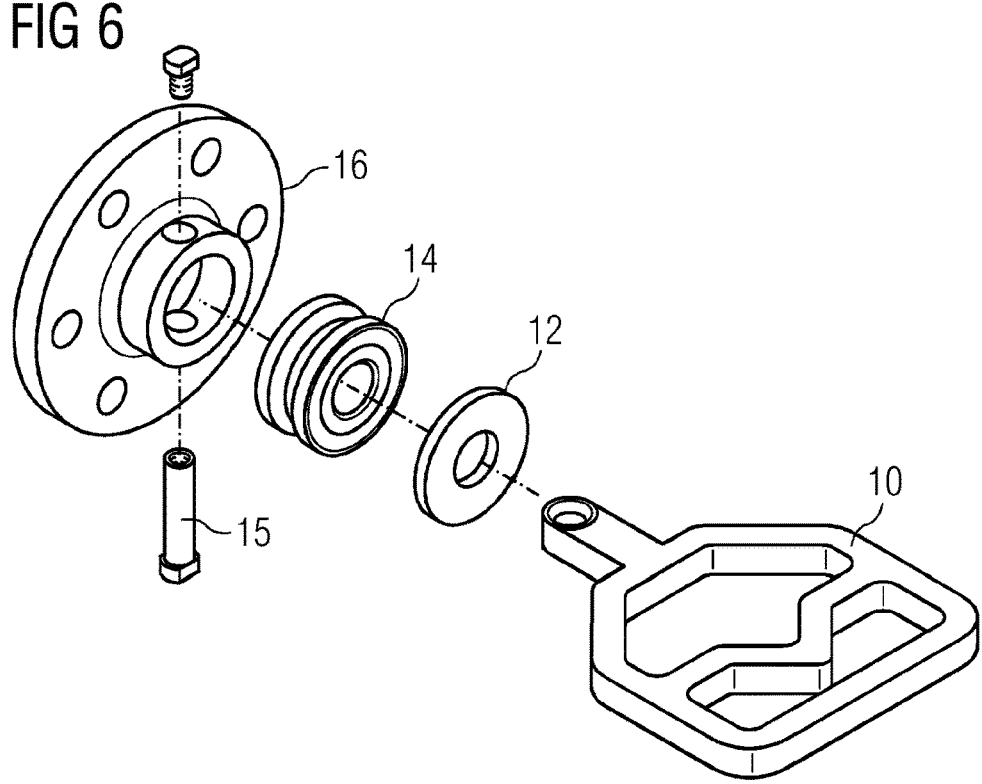
FIG. 6 illustrates more detail of the assembly steps of the method of FIG. 4.
Figure 7:
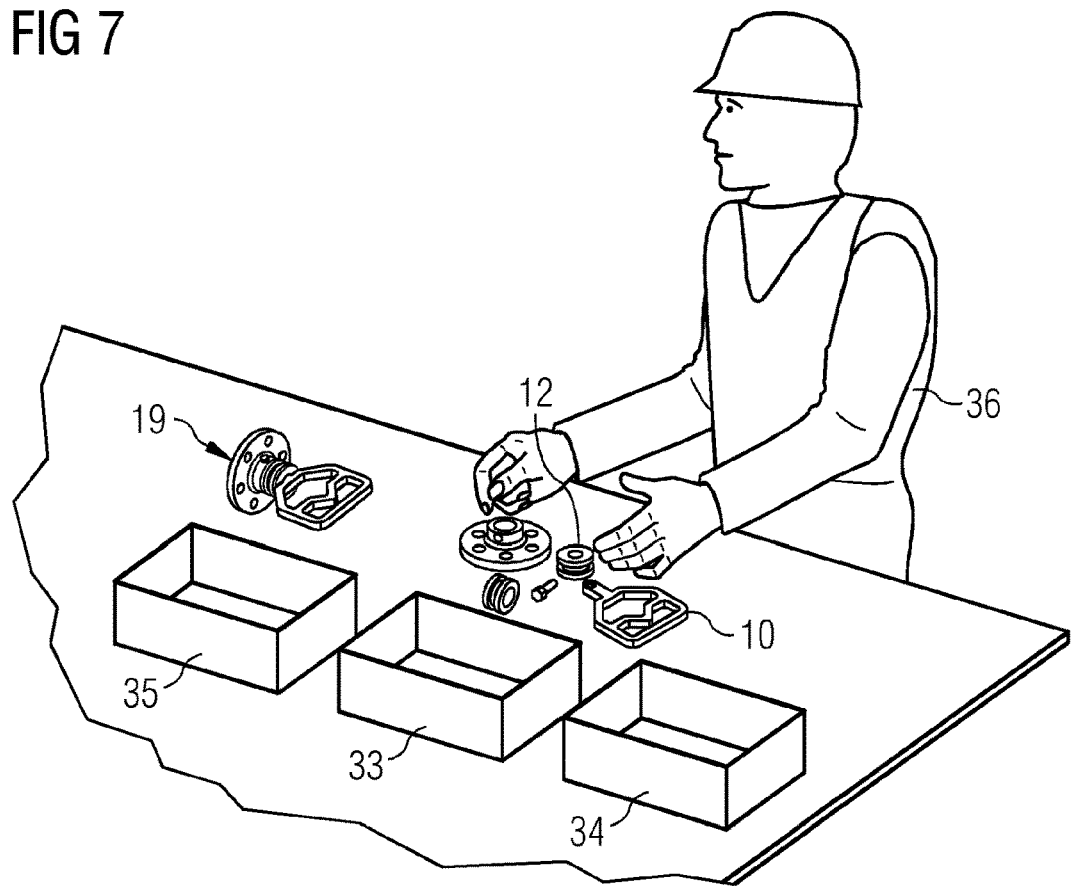
FIG. 7 illustrates more detail of the assemble steps of the method of FIG. 4.

The assembly steps are then carried out as illustrated in FIGS. 6 and 7. The assembly may be automated, using a robot, or may be carried out by a human operator 36. Manufactured parts, such as the handle part 10, bushing support ring or washer 12, bushing 14, securing pin 15 and connector mount 16 may be extracted from storage containers 33, 34, 35 and assembled together as shown in the exploded view of FIG. 6 to fabricate the handle 19. The bushing support disc is received 23 and assembled 24 onto the cut handle part 10. The bushing 14 is mounted 25 on the bushing support 12, 13 and the connector mount 16 secured 26 to the handle by the securing pin 15. The bushing typically comprises rubber or other elastomers, for example, nitrile, fluorosilicone, or silicone. Alternatively, the bushing may comprise mechanical springs made of corrosion resistant materials, such as plastics or corrosion resistant metals such as Inconel.

The design of the handle part is simplified as compared with a cast component because a simple 2D cut out is made, then other parts, such as a bushing support ring, typically in the form of a washer, or disc 12, are manufactured separately 23 and assembled 24 onto the handle part 10. The bushing support disc 12 may be turned on a computer numerical control (CNC) lathe using conventional economical methods and may also be formed as a substantially two-dimensional design. In the conventional cast design, a bushing support abutment 3b was formed as part of the handle part casting 2. By contrast, the water cutting technique from metal plate, allows this abutment part to be replaced with a loose bushing support disc 12 with substantially similar, or even identical, geometry. The bushing support ring may comprise a surface for the bushing 14 to react against, an annular groove to retain and centralise the bushing and a surface for the handle 10 to react against As the bushing support disc 12 is manufactured separately and assembled 24 onto the handle part 10 as part of the fabrication process, then the design of the handle 10 and its manufacturing process is simplified. The bushing 14 is then mounted 25 onto the bushing support limb, or protrusion 13 and the bushing support ring 12 is retained by the pressure exerted by the compressed bushing 14. As the handle part 10 and bushing support disc 12 are now individual substantially flat objects, rather than a single three-dimensional shape that incorporates both the handle and the bushing support, the manufactured parts 10, 12 take up less space during transport, or storage, reducing overall costs. These components 10, 12 can be manufactured in bulk more quickly than is possible with casting the complete handle part 2 individually.

The invention provides a significant cost reduction due to the new manufacturing method, as well as reducing lead times and risks because there is no additional testing required after the handles have been cut and assembled. The method is less harmful and uses significantly less energy intensive than welding or casting, as the material does not need to be melted for a second time. Casting and welding may both result in noxious, or dangerous gases being used or emitted and as both are hot processes, there is the potential for serious burns etc, which requires substantial personal protective equipment for the operator, or guarding. Waterjet cutting uses only water and crushed garnet. The water is cleaned before being released and the garnet is recycled. Operators only need glasses and to stay away from the jet itself. The components do not need to cool and can be handled immediately.

The primary benefits of the invention arise from being able to cut the handle from plate using water jet cutting because this does not create a heat affected zone, so there is no heat related modification of the strength or corrosion resistance properties of the sheet metal. Other methods, such as laser cutting, plasma cutting, flame cutting, machining, or stamping may be used, but heat based cutting methods create a heat affected zone that may affect mechanical properties such as strength or corrosion resistance. In some cases, this would mean that post assembly testing would still be required, so the water cutting method is an advantageous method, as it has all the benefits described above. For stamping, which produces the smallest heat affected zone, the cost of creating the stamp die is significant.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope of the invention in its aspects.

It should be noted that the term "comprising" does not exclude other elements or steps and "a" or "an" does not exclude a plurality. Elements described in association with different embodiments may be combined. It should also be noted that reference signs in the claims should not be construed as limiting the scope of the claims. Although the invention is illustrated and described in detail by the embodiments, the invention is not limited by the examples disclosed, and other variations can be derived therefrom by a person skilled in the art without departing from the scope of the invention.

The invention claimed is:

1. A method of manufacturing a subsea wet-mateable connector handle, the handle comprising a handle part, a bushing support ring, a resilient bushing, a connector mount, and a securing pin; the method comprising:
   cutting a handle part from a sheet of inherently corrosion resistant metal plate by a two-dimensional cutting process;
   assembling a bushing support ring and a bushing onto a limb extending from the handle part;
   mounting a connector mount to the bushing; and
   fixing the connector mount and bushing to the handle part with the securing pin.

2. The method according to claim 1, further comprising:
   forming a hole and/or chamfer in an end of the limb remote from the handle part, to receive an end of the securing pin.

3. The method according to claim 1,
   wherein the two-dimensional cutting process comprises water jet cutting.

4. The method according to claim 1,
   wherein the two-dimensional cutting process comprises one of laser cutting, plasma cutting, flame cutting, machining, or stamping.

5. The method according to claim 4, further comprising:
   a post heat based cutting step of heat treatment to remove stresses such as annealing and/or treatment to rectify stress induced bending.

6. The method according to claim 1,
wherein the metal plate comprises super duplex stainless steel, titanium, or Inconel.

7. The method according to claim 1,
wherein the resilient bushing comprises rubber or other elastomers.

8. The method according to claim 1,
wherein the bushing support ring comprises a surface for the bushing to react against, an annular groove to retain and centralise the bushing, and a surface for the handle to react against.

9. The method according to claim 1,
wherein the securing pin comprises one of a two piece threaded pin, a press fit single pin, or a spring pin.

10. A subsea wet-mateable connector handle, comprising:
a handle part, formed by cutting a predetermined shape in a sheet of inherently corrosion resistant metal plate;
a bushing support ring, formed by turning a metal disc on a lathe;
a resilient bushing;
a connector mount; and
a securing pin, to secure the connector mount and bushing in place.

11. The handle according to claim 10,
wherein the securing pin comprises one of a two piece threaded pin, a press fit single pin, or a spring pin.

12. The handle according to claim 10,
wherein the resilient bushing comprises rubber or other elastomers.

13. The handle according to claim 10,
wherein the metal plate comprises super duplex stainless steel, titanium, or Inconel.

* * * * *